United States Patent
Sakakura (10) Patent No.: US 6,464,181 B2
(45) Date of Patent: Oct. 15, 2002

(54) HOLDER FOR A FLAT CABLE (75) Inventor: Takayuki Sakakura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/767,577

(22) Filed: Jan. 23, 2001

(65) Prior Publication Data
US 2001/0010349 A1 Aug. 2, 2001

(30) Foreign Application Priority Data
Jan. 31, 2000 (JP) .......................... 2000-022616

(51) Int. Cl.[7] .................. F16L 3/22; F16L 33/00
(52) U.S. Cl. .................. 248/68.1; 248/71; 248/73; 24/19 PB
(58) Field of Search .................. 248/68.1, 49, 62, 248/65, 67.5, 69, 71, 73, 74.1, 74.3, 74.4, 503, 449; 24/16 R, 17 A, 17 AP, 16 PB (56) References Cited

U.S. PATENT DOCUMENTS

| | | | | |
|---|---|---|---|---|
| 3,088,702 A | * | 5/1963 | Orenick et al. | 248/71 |
| 3,454,249 A | * | 7/1969 | Geisinger | 248/205.3 |
| 3,674,233 A | * | 7/1972 | Van Buren, Jr. | 248/68.1 |
| 3,713,622 A | * | 1/1973 | Dinger | 251/10 |
| 3,816,818 A | * | 6/1974 | Meier | 439/412 |
| 3,971,105 A | * | 7/1976 | Caveney | 24/16 PB |
| 3,989,210 A | * | 11/1976 | Berkman et al. | 248/73 |
| 4,175,728 A | * | 11/1979 | Ferguson | 269/91 |
| 4,221,352 A | * | 9/1980 | Caveney | 248/74.3 |
| 4,325,526 A | * | 4/1982 | Kitagawa | 248/73 |
| 4,356,599 A | * | 11/1982 | Larson et al. | 24/16 PB |
| 4,564,163 A | * | 1/1986 | Barnett | 248/71 |
| 4,635,886 A | * | 1/1987 | Santucci et al. | 248/73 |
| 4,679,754 A | * | 7/1987 | Richards | 248/68.1 |
| 4,766,651 A | * | 8/1988 | Kobayashi et al. | 24/16 PB |
| 4,768,741 A | * | 9/1988 | Logsdon | 248/62 |
| 5,160,812 A | * | 11/1992 | Takahashi et al. | 174/135 |
| 5,201,484 A | * | 4/1993 | Thoen | 248/68.1 |
| 5,632,457 A | * | 5/1997 | Neely, Jr. | 248/69 |
| 5,820,083 A | * | 10/1998 | Geiger | 248/74.3 |
| 6,126,122 A | * | 10/2000 | Ismert | 248/74.1 |

FOREIGN PATENT DOCUMENTS

| | | | |
|---|---|---|---|
| GB | 1500698 A | * | 2/1978 |
| JP | 9-032970 | | 2/1997 |
| JP | 10-224966 | | 8/1998 |

* cited by examiner

Primary Examiner—Anita King
(74) Attorney, Agent, or Firm—Anthony J. Casella; Gerald E. Hespos (57) ABSTRACT A holder can hold a flat cable without forming a through opening in the flat cable and without breaking it during an attaching work. A holder (12) comprises a substantially flat plate-like main body member (13), a band member (15) for clamping a flat cable (11) in cooperation with the main body member (13) so that a surface of the main body member (13) presses the flat cable (11), and a self-locking member (17) provided on a rear side of the main body member (13) and adapted to engage with a vehicle panel (18). The main body member (13) is provided on its surface with an elongated rib (20) that contacts the flat cable (11) in cooperation with the band member (15).

9 Claims, 8 Drawing Sheets

HOLDER FOR A FLAT CABLE

BACKGROUND OF THE INVENTION

1. Field of the Invention

This invention relates to a holder for a flat cable, and more particularly to a holder for a flat cable in which a plurality of conductors are integrated in a juxtaposed manner. The holder is operative for securing the flat cable to a mating member of a vehicle panel or the like.

2. Description of the Related Art

Most automotive vehicles have a complicated layout of electrical parts that are interconnected by wire harnesses. The wire harnesses often must pass through a narrow space in a vehicle panel, and occasionally must be arranged in a narrow space over a flat plane. A wire harness that must pass through a narrow planar space typically includes a flat cable in which a plurality of conductors are integrated in a juxtaposed manner. The flat cable cannot be secured directly to the vehicle panel. Rather, the flat cable must be held by a special holder and the holder must be attached to the vehicle panel through the holder.

Figure 10A:
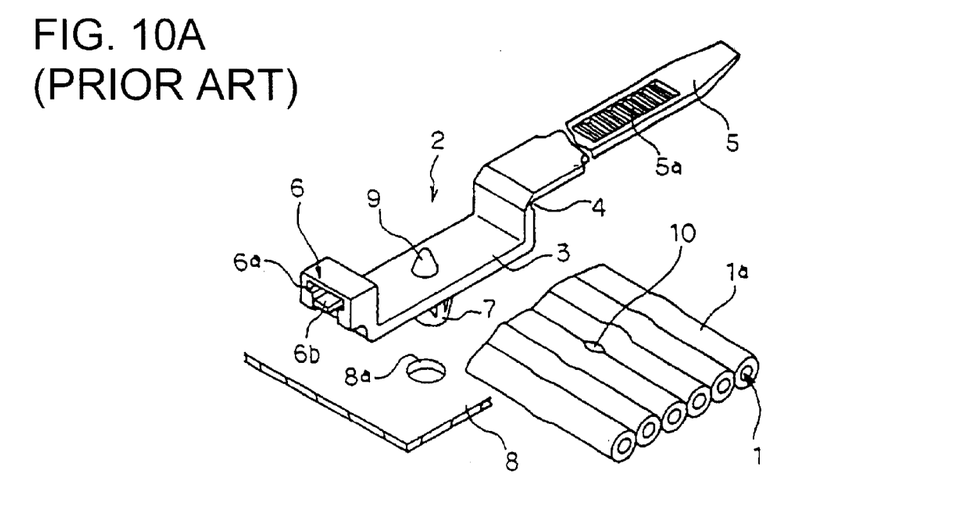
Figure 10B:
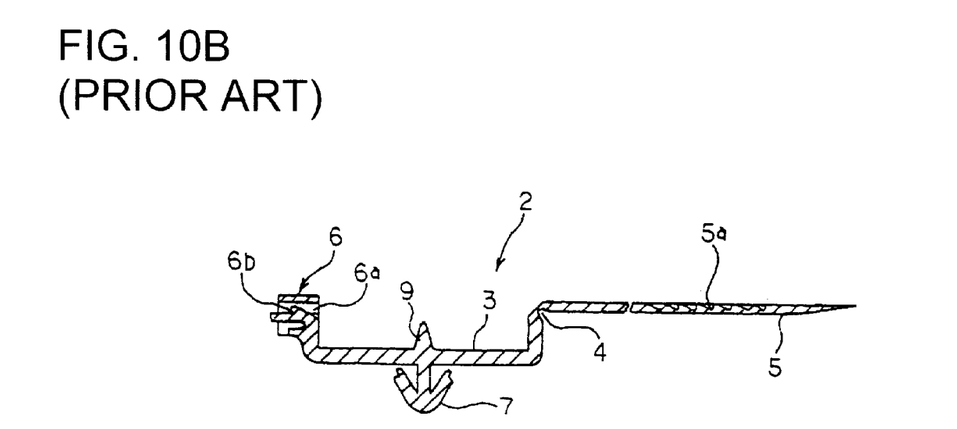
FIG. 10b being a side section view of the holder.

A typical conventional holder for a flat cable is disclosed in Japanese Utility Model Public Disclosure No. SHO 63-187382 (1988), and, for convenience, is illustrated in FIGS. 10a and 10b herein. FIG. 10a shows a flat cable 1 with a plurality of electric wires (conductors) 1a integrated in a juxtaposed manner. A holder 2 holds the flat cable 1.

The holder 2 includes a U-shaped holding member 3 to hold the flat cable 1. A band 5 is coupled through a hinge 4 to an end of the holding member 3. A band lock 6 is provided on the end of the holder 2 opposite the hinge 4. The band lock 6 includes an opening 6a through which a distal end of the band 5 passes, and an engaging projection 6b adapted to engage a serrated portion 5a formed longitudinally on the band 5.

The holding member 3 has a rear surface with a self-locking member 7. The self-locking member 7 is attached around an opening 8a in a vehicle panel 8 to prevent the self-locking member 7 from coming out from the panel 8. The holding member 3 is provided with a projection 9 on a holding surface for holding the flat cable 1. The projection 9 is conical and is dimensioned to be inserted into a through opening 10 formed in any part of the flat cable 1.

The holder 2 is employed by placing the flat cable 1 in the holding member 3 and then inserting the projection 9 into the opening 10 in the flat cable 1. The distal end of the band 5 then is inserted into the through opening 6a of the band lock 6 and the serrated portion 5a of the band 5 is engaged with the engaging projection 6b of the band lock 6. Thus, the flat cable 1 is clamped by means of the band member 5 and holding member 3. Thereafter, the self-locking member 7 is inserted into the opening 8a in the vehicle panel 8 to secure the holder 2 to the panel 8. Thus, the holder 2 attaches the flat cable 1 to the vehicle panel 8.

The holding member 3 is attached to the flat cable 1 by inserting the projection 9 into the opening 10. Thus, it is possible to prevent the flat cable 1 from moving in the holder 2 and to attach the flat cable 1 securely to the holder 2.

However, the conventional holder 2 requires the conical projection 9 on the holding member 3 to be inserted into the flat cable 1. Therefore, it is necessary to form the opening 10 in the flat cable 1. This requires care to ensure that the vinyl cover of the flat cable 1 is not broken during the formation of the opening 10, and further requires care during the insertion of the projection 9 into the opening 10. Consequently, this involves reducing working convenience and reducing working efficiency.

Accordingly, an object of the present invention is to provide a holder that can hold a flat cable without forming a through opening in the flat cable and without breaking it during an attaching work.

SUMMARY OF THE INVENTION

The invention is directed to a holder for a flat cable in which a plurality of conductors are integrated in a juxtaposed manner. The holder comprises a substantially flat plate-like main body and a pressing member. The main body has front surface and an opposite rear side with an engaging member that is adapted to engage with a mating member. The pressing member is disposed for clamping the flat cable against the front surface of the main body. An elongate holding member is provided either on the front surface of the main body or on the surface of the pressing member that faces the main body. Thus, the elongated holding member contacts the flat cable in cooperation with either the main body or the pressing member. Accordingly, it is possible to hold the flat cable without working it, and particularly without forming a hole in the flat cable. Also, since the flat cable is brought into contact with the elongated holding member, it is possible to prevent the flat cable from moving in the holder, thereby stably holding the flat cable.

The pressing member may include a band with opposite first and second ends. The first end of the band may be connected to a first end of the main body. The main body may also include a second end formed with a through opening into which the second end of the band is inserted. The through opening may have an interior formed with an engaging projection that is adapted to engage with serrations formed longitudinally on the band. Thus, the second end of the band can be inserted into the through opening formed in the second end of the main body so that the serrations on the band member can be engaged with the engaging projection. Thus the flat cable can be clamped securely between the band and the main body.

The main body may include a band integrated on each of the opposite ends of the main body, and the pressing member may be provided with through openings on each of its opposite ends. Each through opening may be provided with an engaging projection adapted to engage with serrations on the band. The band can be inserted into the through openings formed in the opposite ends of the pressing member so that the serrations can be engaged with the engaging projections. Thus, the flat cable can be clamped securely between the pressing member and the main body. In this embodiment, the pressing member is formed separately from the main body. However, the bands couple the pressing member and main body. Therefore, it is possible to superpose several flat cables on each other and to attach them to the holder.

Through openings may be provided on each of the opposite ends of the main body and additional through openings may be provided on each of the opposite ends of the pressing member. The main body member and pressing member then may be coupled to each other by aligning their respective through openings and inserting separate binding members into the aligned pairs of through openings. Thus, the binding members securely clamp the flat cable between the pressing member and the main body. In this embodiment, the pressing member is formed separately from the main body and the binding members couple the pressing member and main body to each other. Therefore, it is possible to superpose several flat cables on each other and to attach them to the holder by employing binding members of appropriate length.

Each binding member may include a binding band, and the binding band may comprise a band member having serrations. A through opening may be formed in a first end of the band member and may be adapted to receive the second end of the band member. An engaging projection may be formed on the interior of the through opening and may be adapted to engage the serrations formed on the band member. In this case, it is possible to couple the pressing member and main body member by an existent binding band and to reduce the cost of the holder.

An engaging projection may be provided in at least one of the through openings at the opposite ends of the main body. Additionally, the binding member may include a binding band. The binding band may comprise a serrated band member with a stopper on an end of the band member. The engaging projection of the main body may engage with the serrations of the band member when the band member is inserted into the through openings in the main body. In this case, the flat cable is positioned between the pressing member and the main body. The band member then is inserted from one through opening in the main body to one through opening in the pressing member. The band member then is inserted through the other through opening in the pressing member and finally into the other through opening in the main body. By bringing the stopper of the band member into contact with the pressing member at a side of one through opening and causing the serrations to be engaged with the engaging projection, the pressing member and main body are interconnected, thereby firmly securing the flat cable to the holder.

The pressing member may include a binding band comprising a serrated band member formed separately from the main body. A stopper may be provided on an end of the band member. Through openings may be provided on opposite ends of the main body. An engaging projection is formed on the interior of at least one through opening and is adapted to engage with the serrations on the band member. In this case, the band member may be inserted into one through opening in the main body until the stopper of the band member is brought into contact with the main body at a side of the one through opening. The flat cable then is positioned between the band member and the main body, and the band member is inserted into the other through opening in the main body so that the serrations are engaged with the engaging projection, thereby coupling the band member and main body member to each other and securing the flat cable firmly to the holder.

The holding member in any of the embodiments may include a rib having a thickness which increases from opposite ends of said holding member to a central portion thereof. In this case, since the flat cable can be brought into contact with the holding member having a raised central portion, it is possible to arrange the flat cable between the main body member and the pressing member with no clearance.

The holding member may be a plate-like member made of an elastomer. In this case, the flat cable can depress the elastomeric holding member when the flat cable is clamped between the main body and the pressing member. Therefore, it is possible to arrange the flat cable between the main body and the pressing member with no clearance.

BRIEF DESCRIPTION OF THE DRAWINGS

The foregoing and other features of the present invention will become apparent to one skilled in the art to which the present invention relates upon consideration of the invention with reference to the accompanying drawings, wherein:

FIG. 1 shows a first embodiment of a holder for a flat cable in accordance with the present invention, FIG. 1a being a side elevation view of the holder, FIG. 1b being a bottom view of the holder taken by an arrow X in FIG. 1a, and FIG. 1c illustrating the holder, to which a flat cable is attached, and a vehicle body.

FIG. 4 shows the second embodiment of the holder, FIG. 4a being a side elevation view of the main body member.

FIG. 6 shows a third embodiment of a holder for a flat cable in accordance with the present invention, FIG. 6a being a perspective view of a pressing member, FIG. 6b being a perspective view of a binding member, and FIG. 6c illustrating the holder, to which a flat cable is attached, and a vehicle body.

FIG. 7 shows a fourth embodiment of a holder for a flat cable in accordance with the present invention, FIG. 7a being a perspective view of a main body member, FIG. 7b being a side elevation view of the main body member, and FIG. 7c being a bottom view of the main body member.

FIG. 8 shows a fourth embodiment of the holder, FIG. 8a being a side elevation view of a self-locking member.

FIG. 9 shows a fifth embodiment of a holder for a flat cable in accordance with the present invention, FIG. 9a being a perspective view of a pressing member.

FIG. 10 shows a conventional holder, FIG. 10a being a perspective view of the holder, a flat cable, and a vehicle body panel.

DETAILED DESCRIPTION OF THE PREFERRED EMBODIMENTS

Figure 1A:
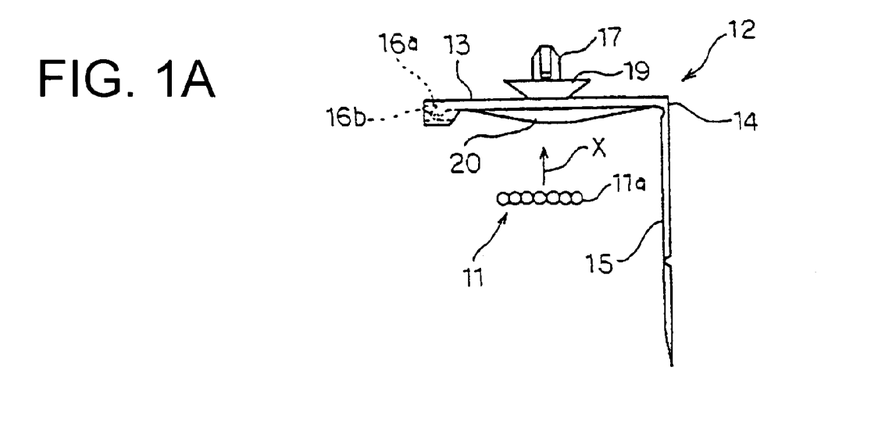
Figure 1B:
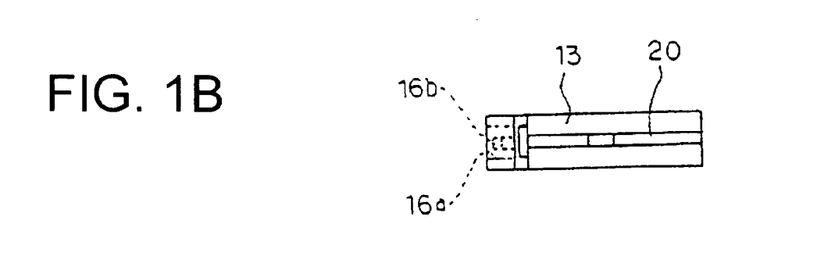
Figure 1C:
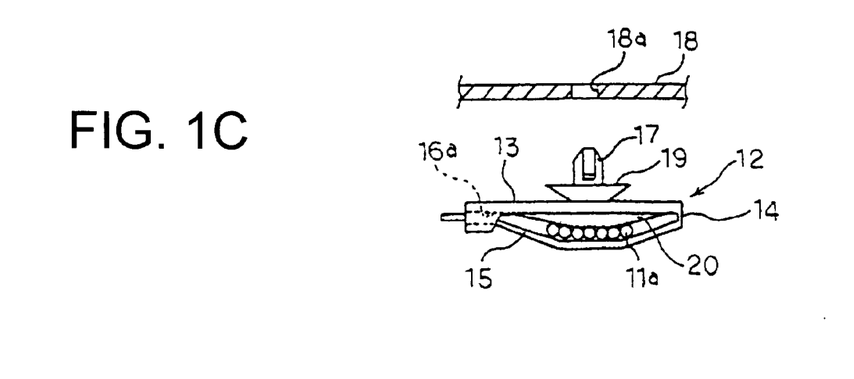

FIGS. 1a to 1c show a holder 12 for securing a flat cable 11. The flat cable 11 includes a plurality of substantially parallel electric wires (conductors) 11a integrated in a juxtaposed or side by side manner. The flat cable 11 is attached to the holder 12, as explained herein.

The holder 12 has a substantially flat plate-like main body 13 with opposite first and second ends and a front surface between the ends for contacting the flat cable 11. The holder 12 further includes a band (pressing member) 15 that has opposite first and second ends. The first end of the band 15 is connected to the first end of the main body 13 by a hinge 14. The band 15 is provided with an array of serrations (not shown) extending transversely at spaced locations along the length of the band.

The second end of the main body 13 has a through opening 16a through which the second end of the band member 15 can pass. An engaging projection 16b is formed on the interior of the through opening 16a and is configured to engage with the serrations of the band 1.

A self-locking member (engaging member) 17 is formed on a rear side of the main body 13. The self-locking member 17 is configured to pass through an aperture 18a in a vehicle body panel (mating member) 18 and is locked on a surface of the panel 18 so that the self-locking member 17 cannot come out from the aperture 18a. A dish-like member 19 is formed on the rear side of the main body 13 and surrounds the self-locking member 17. The dish-like member 19 presses a side of the panel 18 to enhance an engaging force exerted by the self-locking member 17, when the self-locking member 17 comes into contact with the other side of the panel 18.

The front surface of the main body 13 has an elongated rib (holding member) 20 with a thickness that increases gradually from the opposite first and second ends of the main body 13 to a central portion in a longitudinal direction. The rib 20 will contact the flat cable 11 that is clamped between the main body 13 and the band 15. In this embodiment, the holder 12 is made of a material such as a plastic resin, a rubber, or the like.

The flat cable 11 is attached to the holder 12 by first clamping the flat cable 11 between the band 15 and the main body 13. The second end of the band 15 then is inserted into the through opening 16a formed in the second end of the main body 13 to bring the serrations into engagement with the engaging projection 16b. Thus, the flat cable 11 can be secured firmly to the holder 12 by coupling the band 15 and main body 13 to each other.

At this time, the elongated rib 20 presses the flat cable 11 against the band 15. Therefore, it is possible to hold the flat cable 11 without applying any work to the flat cable 11, such as forming a hole in the flat cable 11, as had been done in the prior art. Since the flat cable 11 is brought into contact with the elongated rib 20, it is possible to prevent the flat cable 11 from moving in the holder 12, and hence the flat cable 11 can be held stably.

The flat cable 11 can be brought into contact with the thickened central portion of the rib 20. Accordingly, it is possible to arrange the flat cable 11 between the main body 13 and the band 15 without forming any clearance between them.

Figure 2:
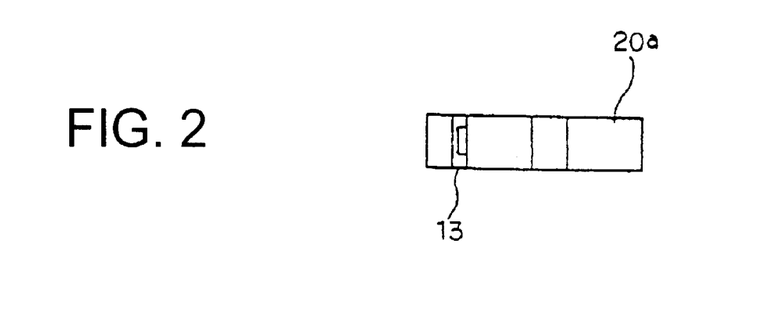
FIG. 2 is a bottom view of a main body member in the first embodiment, illustrating another configuration of the main body member.

The holding member is not limited to embodiments that include the rib 20. For example, as shown in FIG. 2, the holding member may include a plate 20a made of an elastomer which is different from a material of the main body 13. In this case, the plate-like member 20a is superposed on the main body 13 to form a dual layer configuration. If the holding member is made of the elastomer, it is possible for the flat cable 11 to depress the plate 20a made of the elastomer, when the flat cable 11 is clamped by means of the main body 13 and band 15. Consequently, the flat cable 11 can be arranged between the main body 13 and the band 15 with no clearance.

In the present embodiment, the rib 20 is provided on the surface of the main body 13. However, the rib 20 may be provided on a surface of the band 15 (a surface opposed to the main body 13), which will perform the same effect.

Figure 3:
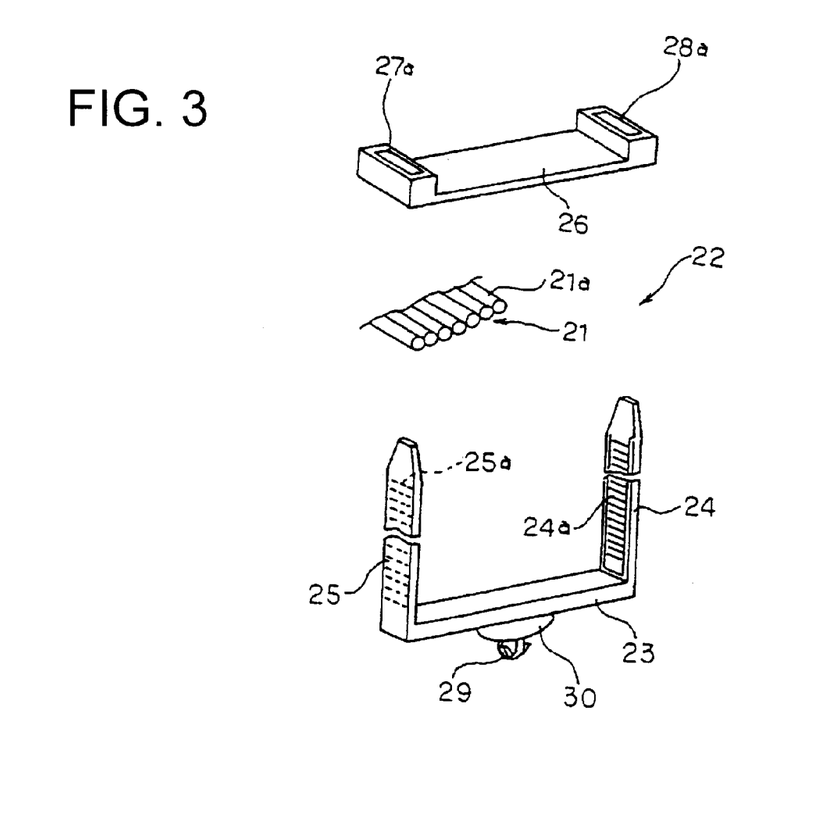
FIG. 3 is an exploded perspective view of a second embodiment of a holder for a flat cable in accordance with the present invention, illustrating a main body member and a pressing member of the holder.
Figure 4A:
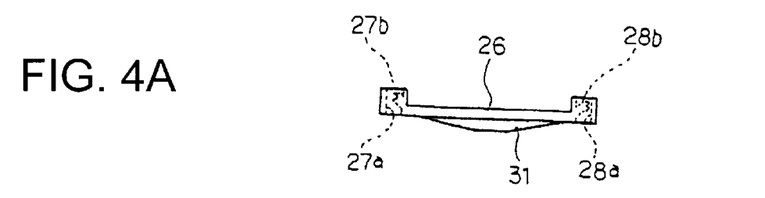
Figure 4B:
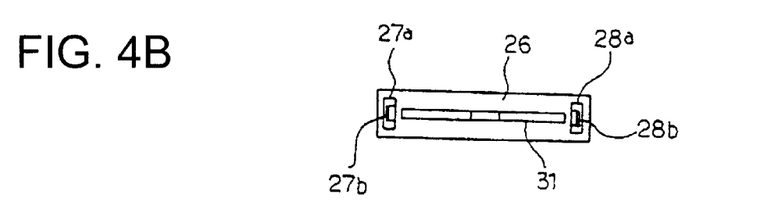
FIG. 4b being a bottom view of the main body member.
Figure 4C:
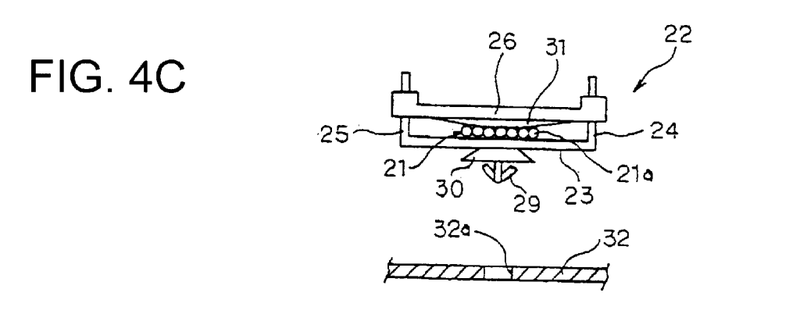
FIG. 4c illustrating the holder, to which a flat cable is attached, and a vehicle body.
Figure 5:
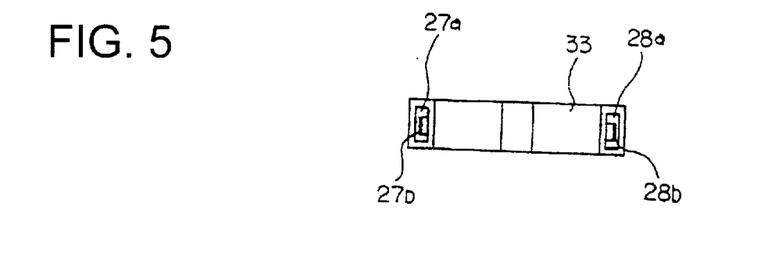
FIG. 5 is a bottom view of a main body member in the second embodiment, illustrating another configuration of the main body member.

FIGS. 3–5 show an alternate holder 22 for holding a flat cable 21. The flat cable 21 includes a plurality of electric wires (conductors) 21a integrated in a juxtaposed or side by side manner.

The holder 22 has a substantially flat plate-like main body 23 with a front surface for contacting the flat cable 21. The main body 23 also has opposite first and second ends, which are provided respectively with first and second bands 24 and 25. The bands 24 and 25 are provided with arrays of serrations 24a and 25a that extend transversely at spaced intervals along the length of the respective bands 24 and 25.

The holder 22 further includes a pressing member 26. The pressing member 26 has opposite first and second ends, which are provided respectively with first and second through openings 27a and 28a through which the respective first and second bands 24 and 25 can pass. The through opening 27a and 28a are provided on their interiors with engaging projections 27b and 28b that can engage with the serrations 24a and 25a on the bands 24 and 25.

A self-locking member (engaging member) 29 is formed on a rear side of the main body 23. The self-locking member 29 is configured to pass through an aperture 32a in a vehicle body panel (mating member) 32 and can be locked on a surface of the panel 32 so that the self-locking member 29 cannot come out from the aperture 32a. The rear side of the main body 23 further is provided with a dish-like member 30 which surrounds the self-locking member 29. The dish-like member 30 presses a side of the panel 32 to enhance an engaging force exerted by the self-locking member 30, when the self-locking member 30 comes into contact with the other side of the panel 32.

The front surface of the main body 23 has an elongated rib (holding member) 31 with a thickness that increases gradually from the opposite first and second ends to a central portion between the ends. The rib 31 contacts the flat cable 21 clamped between the main body 23 and the pressing member 26. In this embodiment, the holder 22 is made of a material such as a plastic resin, a rubber, or the like.

The flat cable 21 is attached to the holder 22 by clamping the flat cable 21 between the pressing member 26 and the main body member 23. The band members 24 and 25 then are inserted into through openings 27a and 28a formed in the opposite ends of the pressing member 26, respectively to bring the serrations 24a and 25a into engagement with the engaging projections 27b and 28b. The flat cable 21 can be secured firmly to the holder 22 by coupling the pressing member 26 and main body 23 to each other.

At this time, the elongated rib 31 can press the flat cable 21 against the main body 23. Accordingly, it is possible to accomplish the same effect as that of the first embodiment.

In the present embodiment, the pressing member 26 is separated from the main body member 23 and the band members 24 and 25 are attached to the opposite ends of the pressing member 26. Therefore, it is possible to superpose the flat cables 21 on each other and to attach the flat cables 21 to the holder 22.

The holding member of the subject invention is not limited to embodiment that include the holding rib 31. For example, as shown in FIG. 5, the holding member may include a plate 33 made of an elastomer which is a different element from the pressing member 26. In this case, the elastomeric plate 33 is superposed on the pressing member 26 to form a dual layer configuration. Thus, it is possible to accomplish the same effect as that of the first embodiment.

In the illustrated embodiment, the rib 31 is provided on the surface of the pressing member 26. However, the rib 31 may be provided on the front surface of the main body 23. The through openings 27a and 28a and engaging projections 27b and 28b are formed on the opposite ends of the pressing member 26, while the band members 24 and 25 are formed on the opposite ends of the main body 23. However, the through openings 27a and 28a and engaging projections 27b and 28*b* may be provided on the opposite ends of the main body 23 and the band members 24 and 25 may be provided on the opposite ends of the pressing member 26.

Figure 6A:
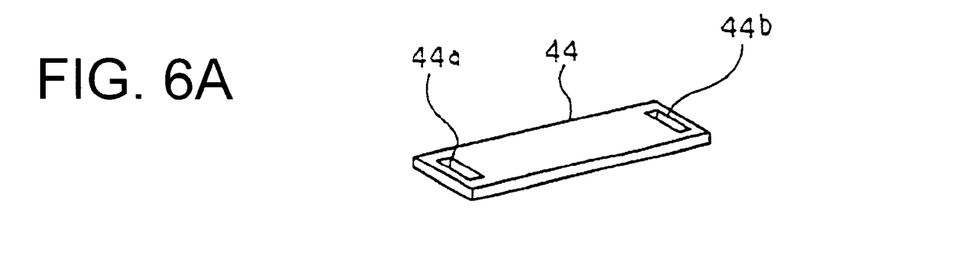
Figure 6B:
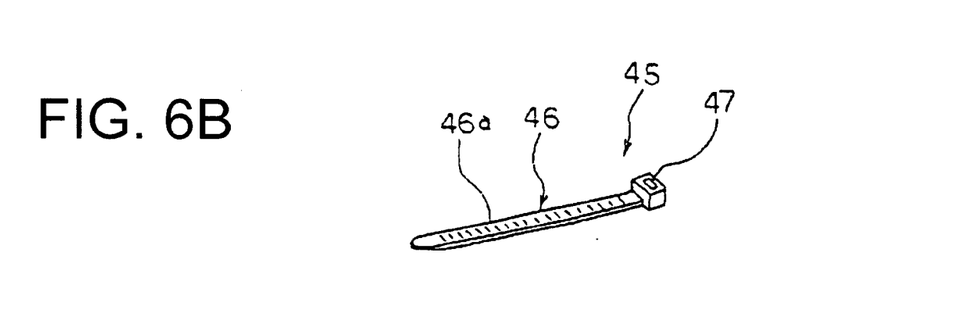
Figure 6C:
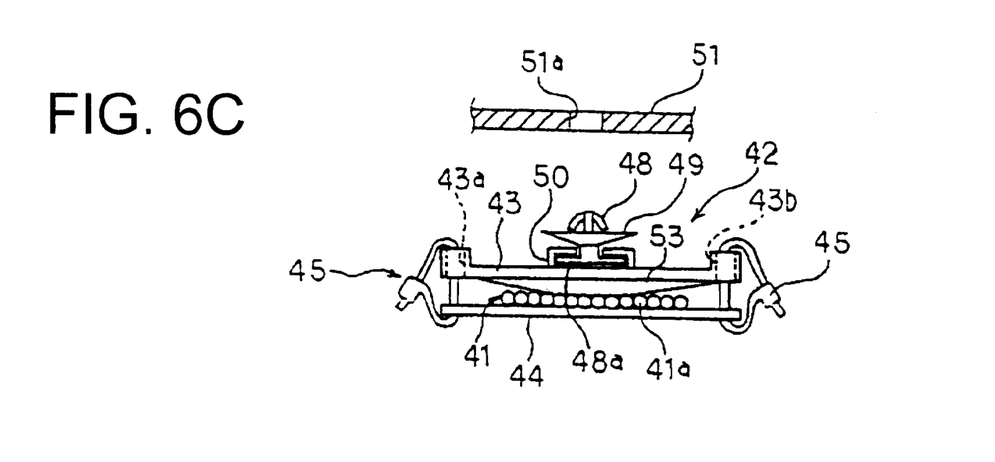

FIGS. 6*a* to 6*c* illustrate a holder 42 for holding a flat cable 41. The flat cable 41 includes a plurality of electric wires (conductors) 41*a* integrated in a juxtaposed or side by side manner.

The holder 42 has a substantially flat plate-like main body 43 with a front surface for contacting the flat cable 41. The main body 43 has opposite first and second ends with through openings 43*a* and 43*b*. The holder 42 further includes a pressing member 44 with opposite first and second ends formed with through openings 44*a* and 44*b*. A binding band (binding member) 45 is inserted into the through openings 43*a*, 43*b*, and 44*a*, 44*b*. The binding band 45 includes a longitudinally extending band member 46 with opposite first and second ends. Transversely aligned serrations 46*a* are formed at longitudinally spaced intervals on the band member 46. A through opening 47 is formed in the first end of the band member 46 and is adapted to pass the second end of the band member 46. An engaging projection (not shown) is formed in the through opening 47 and is adapted to engage with the serrations 46*a*.

A self-locking member (engaging member) 48 is formed on a rear side of the main body 43. An engaging plate 48*a* is provided on a bottom surface of the self-locking member 48, and is detachably coupled to a slide rail 50 provided on a rear surface of the main body 43. The self-locking member 48 is configured to pass through an aperture 51*a* in a vehicle body panel (mating member) 51 and is locked on a first surface of the panel 51 so that the self-locking member 48 cannot come out from the aperture 51*a*. A dish-like member 49 projects from the engaging member 48*a* and surrounds the self-locking member 48. The dish-like member 49 presses the second surface of the panel 51, which is the surface opposite the self-locking member 48, to enhance an engaging force exerted by the self-locking member 48 when the self-locking member 48 comes into contact with first surface of the panel 51.

The main body 43 is provided on its front surface with an elongated rib (holding member) 53. The rib 53 has a thickness, which increases gradually from opposite ends to a central portion in a longitudinal direction. When the flat cable 41 is clamped between the main body 43 and the pressing member 44, the rib 53 contacts the flat cable 41. In this embodiment, the holder 42 is made of a material such as a plastic resin, a rubber, or the like.

The flat cable 41 is clamped between the pressing member 44 and the main body member 43 by inserting the band members 46 of the binding band 45 through openings 43*a*, 44*a* and 43*b*, 44*b*. The ends of the band members 46 then are inserted into the respective through openings 47 to bring the serrations 46*a* into engagement with the engaging projection in the through opening 47, thereby binding the binding band 46.

The flat cable 41 can be secured firmly to the holder 42 by coupling the pressing member 44 and main body member 43 to each other by the binding band 45.

At this time, the elongated rib 53 presses the flat cable 41 against the pressing member 44. Hence, it is possible to accomplish the same effect as the first embodiment.

In the embodiment illustrated in FIG. 6, the pressing member 44 is a different element from the main body 43. Additionally, the binding bands 45 are attached to the opposite ends of the pressing member 44 and main body member 43. Accordingly, it is possible to superpose the flat cables 41 on each other and to attach the flat cables 41 to the holder 42.

In the embodiment of FIG. 6, the holding member includes the holding rib 53. However, the invention is not limited to the illustrated configuration. For example, the holding member may include a plate-like member made of an elastomer, which is a different element from the main body 43. In this case, the plate-like member is superposed on the main body 43 to form a dual layer configuration. Thus, it is possible to accomplish the same effect as that of the first embodiment.

In the FIG. 6 embodiment, the rib 53 is provided on the surface of the main body 43. However, the rib 53 may be provided on a surface of the pressing member 44.

Figure 7A:
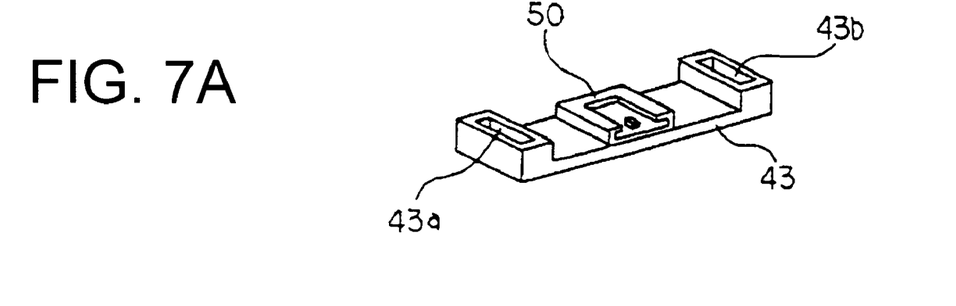
Figure 7B:
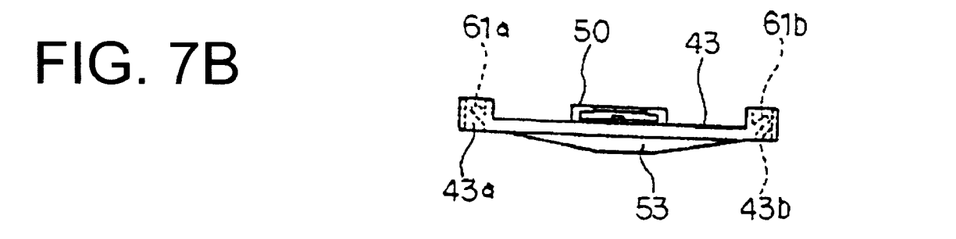
Figure 7C:
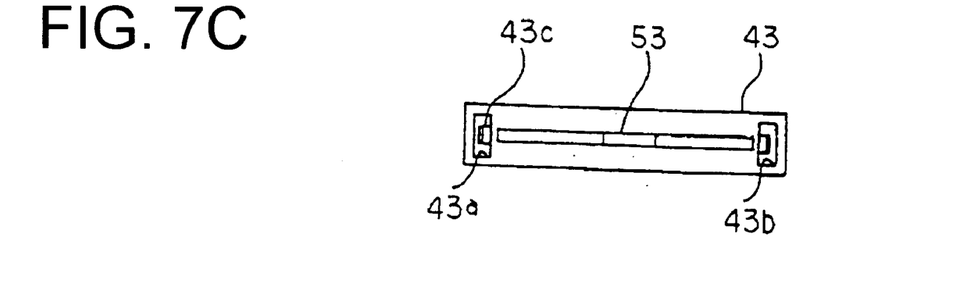
Figure 8A:
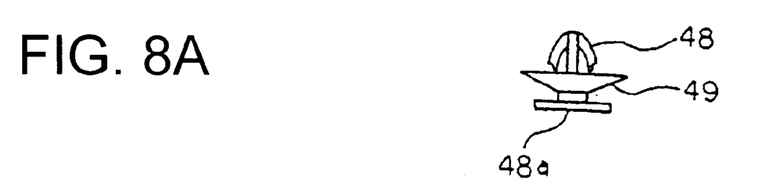
Figure 8B:
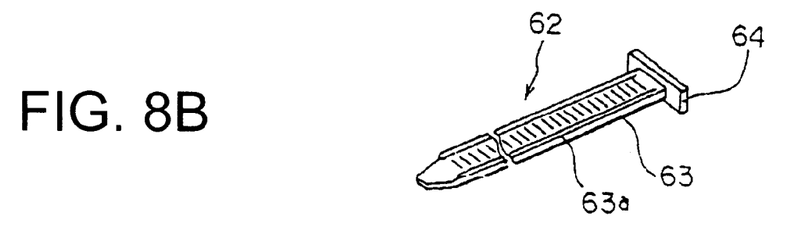
FIG. 8b being a perspective view of a binding band.
Figure 8C:
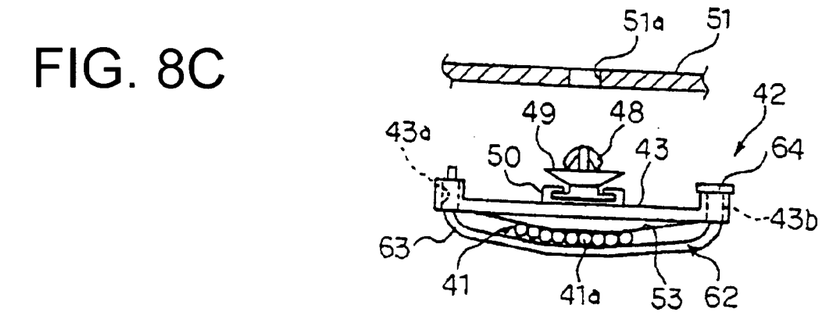
FIG. 8c illustrating the holder, to which a flat cable is attached, and a vehicle body.

A fourth embodiment of the subject invention is illustrated in FIGS. 7 and 8. Elements of the fourth embodiment that are the same as those in the third embodiment are given by the same numbers and an explanation of them is omitted here.

FIGS. 7*a* to 7*c* and 8*a* to 8*c* show a main body 43 with opposite first and second ends. Through openings 43*a* and 43*b* are formed in the opposite ends of a main body 43 and are provided with engaging projections 43*c*. A binding band 62 includes a longitudinally extending band member 63. Serrations 63*a* are formed longitudinally on the band member 63, and a stopper member 64 is provided on an end of the band member 63.

A flat cable 41 can be attached to the holder 42 in the embodiment of FIGS. 7*a* to 8*c* by inserting the band member 63 into through opening 43*b*. The flat cable 41 then is positioned between the band member 63 and the main body 43. Next, the band member 63 is inserted into the through opening 43*a*, and the serrations 63*a* are engaged with the engaging projections 61*a* and 61*b*. The stopper 64 eventually contacts an end surface around the through opening 43*b*, thereby coupling the binding band 62 and main body member 43 to each other.

The flat cable 41 can be secured firmly to the holder 42 by coupling the binding band 62 and main body 43 to each other. At this time, the elongated rib 53 can press the flat cable 41 against the binding band 62. In this manner, it is possible to accomplish the same effect as that of the first embodiment.

The embodiment of FIGS. 7*a*–8*c* is not limited to a holding member that includes the rib 53. For example, the holding member may include a plate-like member made of an elastomer, which is a different element from the main body member 43. In this case, the plate-like member is superposed on the main body member 43 to form a dual layer configuration. Hence, it is possible to accomplish the same effect as that of the first embodiment.

In the embodiment of FIGS. 7*a*–8*c*, the engaging projections 61*a* and 61*b* are provided in the through openings 43*a* and 43*b* formed in the opposite ends of the main body member 43, respectively. However, the engaging projection may be provided in either through opening 43*a* or 43*b*. In this case, the band member 63 is coupled to the main body 43 by disposing the stopper 64 at a side of the through opening having no engaging projection.

Figure 9A:
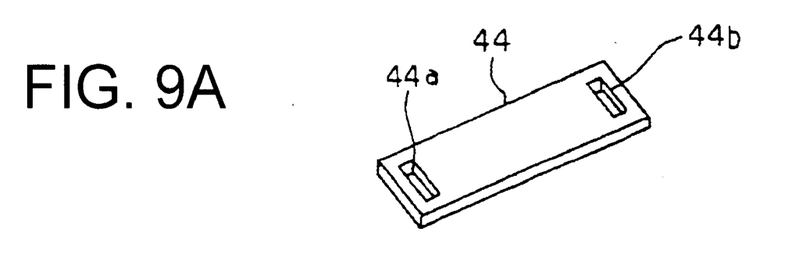
Figure 9B:
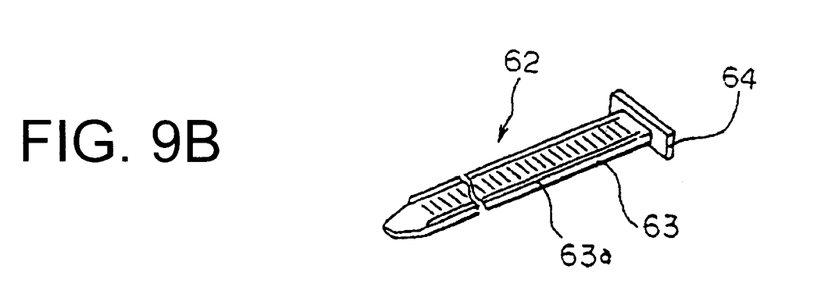
FIG. 9b being a perspective view of a binding band.
Figure 9C:
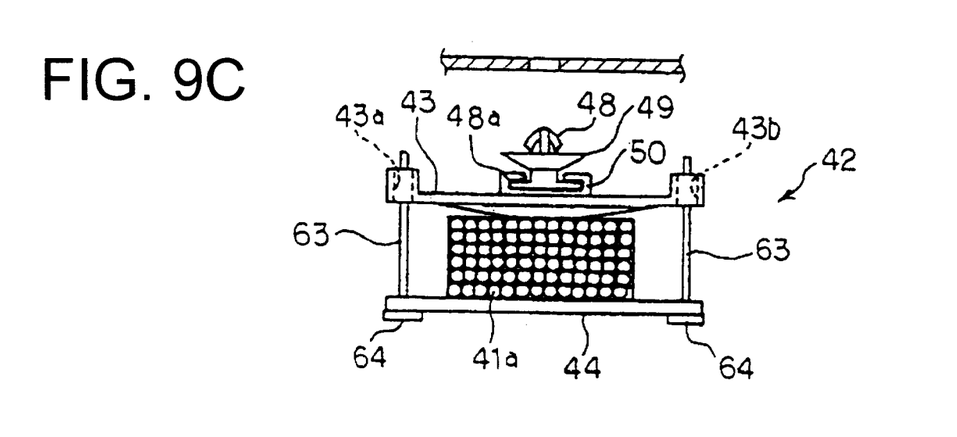
FIG. 9c illustrating the holder, to which a flat cable is attached, and a vehicle body.

A fifth embodiment is illustrated in FIGS. 9*a*–9*c*. Elements of the fifth embodiment that are the same as those in the third and fourth embodiments are designated by the same numbers and an explanation of them is omitted here.

FIGS. 9*a* to 9*c* show a main body 43 with opposite first and second ends. Through openings 43*a* and 43*b* are formed in opposite ends of the main body member 43 and are provided with the same engaging projections as those in the third and fourth embodiments, respectively. The holder further includes a pair of binding bands 62, each of which includes a longitudinally extending band member 63. Serrations 63a are formed transversely at longitudinally spaced intervals on the band member 63, and a stopper 64 is provided on an end of the band member 63.

The cable 41 can be attached to the holder 42 in the embodiment of FIGS. 9a–9c by positioning the flat cable 41 between the pressing member 44 and the main member 43. The band members 63 are inserted through the openings 44a and 44b and into the through openings 43a and 43b. The serrations 63a then are engaged with the engaging projections in the through openings 43a and 43b when the stoppers 64 contact surfaces around the through openings 44a and 44b, thereby coupling the main body member 43 and pressing member 44 to each other through the binding bands 62.

The flat cable 41 can be secured firmly to the holder 42 by coupling the pressing member 44 and main body 43 to each other. At this time, the elongated rib 53 can press the flat cable 41 against the binding band 62. Consequently, it is possible to accomplish the same effect as that of the first embodiment.

In the FIGS. 9a–9c embodiment is not limited to embodiments where the holding member includes the rib 53. For example, the holding member may include a plate-like member made of an elastomer, which is a different element from the main body member 43. In this case, the plate-like member is superposed on the main body member 43 to form a dual layer configuration. Thus it is possible to accomplish the same effect as that of the first embodiment.

In the embodiment of FIGS. 9a–9c, the rib 53 is provided on the surface of the main body member 43. However, the rib 53 may be provided on a surface of the pressing member 44.

In each of the above embodiments, the flat cable is a wire harness having juxtaposed conductors. However, the invention is not limited to such wire harnesses. For example, the present invention may be applied to a flat cable comprising a flexible print circuit (FPC) in which plate-like conductors are juxtaposed.

From the above description of the invention, a person skilled in the art will perceive improvements, changes and modifications. Such improvements, changes and modifications within the skill of the art are intended to be covered by the appended claims.

The entire disclosure of Japanese Patent Application No. HEI 12-(2000) filed on Jan. 31, 2000 including specification, claims, drawings and summary is incorporated herein by reference in its entirety.

What is claimed is:

1. A holder for a flat cable with a plurality of side by side conductors, comprising:
   an elongated main body with opposite front and rear surfaces and opposite first and second longitudinal ends;
   an engaging member provided on the rear surface of the main body and adapted to engage with a mating member;
   an elongated holding member having a first end in proximity to the first end of the main body and a second end in proximity to the second end of the main body, said elongated holding member projecting from the front surface of the main body and being substantially convex from said first end to said second end thereof; and
   a pressing member for clamping said flat cable between said elongated holding member and said pressing member.

2. A holder for a flat cable according to claim 1, wherein said pressing member includes a band member having an end connected to the first end of said main body, wherein said main body is provided on the second end thereof with a through opening into which the other end of said band member is inserted, and wherein said through opening is provided on an interior thereof with an engaging projection which is adapted to engage with a serrated portion formed longitudinally on said band member.

3. A holder for a flat cable according to claim 1, wherein said main body includes a band member integrated on each of the opposite ends of said main body, wherein said pressing member is provided on each of opposite ends thereof with a through opening into which said respective band members are inserted, and wherein each of said through openings is provided on the interior with an engaging projection which is adapted to engage with serrations formed longitudinally on said band members.

4. A holder for a flat cable according to claim 1, wherein said main body is provided on each of the opposite first and second ends thereof with a through opening and said pressing member is provided on each of opposite ends thereof with a through opening, and wherein said main body and pressing member are coupled to each other by inserting a binding member into said through openings.

5. A holder for a flat cable according to claim 4, wherein said binding member includes a band member having serrations formed longitudinally on said band member, a through opening formed in an end of said band member and adapted to pass an end of said band member, and an engaging projection formed on an interior of said through opening and adapted to engage with said serrations formed on said band member.

6. A holder for a flat cable according to claim 1, wherein said pressing member includes a binding band comprising a band member being a different element from said main body and having serrations formed longitudinally on said band member, and a stopper provided on an end of said band member, wherein said main body is provided in the opposite first and second ends thereof with through openings, and wherein each of said through openings is provided on an interior thereof with an engaging projection adapted to engage with said serrations on said band member.

7. A holder for a flat cable according to claim 1, wherein said pressing member comprises a binding band including a band member having serrations formed longitudinally on said band member, and a stopper provided on an end of said band member, wherein said main body is provided on each of opposite ends thereof with a through opening, and wherein one of said through openings is provided on an interior thereof with an engaging projection adapted to engage with said serrations on said band member.

8. A holder for a flat cable according to claim 1, wherein said holding member is a substantially planar plate made of an elastomer.

9. A holder for a flat cable with a plurality of side by side conductors, comprising:
   a main body with opposite front and rear surfaces and opposite ends, each said end of said main body having a through opening and wherein each of said through openings in the opposite ends of said main body is provided on an interior thereof with an engaging projection;
   a pressing member for clamping said flat cable between said main body and said pressing member so that the front surface of said main body presses said flat cable, said pressing member being provided on each of opposite ends thereof with a through opening;

an engaging member provided on the rear surface of said main body and adapted to engage with a mating member;

an elongate holding member disposed on a selected one of the main body and the pressing member for clamping said flat cable between said main body and said pressing member; and binding member s coupling said main body and said pressing member, wherein each said binding member includes a band member having serrations formed longitudinally on said band member, and a stopper formed on an end of said band member, and wherein said engaging projection of said main body engages with said serrations of said band member when said band member is inserted into said through openings in said main body and in said pressing member, thereby coupling said main body and pressing member to each other.

* * * * *